United States Patent [19]

Oelke

[11] 4,077,791

[45] Mar. 7, 1978

[54] ELECTRICAL CONTACT APPARATUS ON A GLASS SHEET GRAVITY MOLD

[75] Inventor: Waldemar W. Oelke, Rossford, Ohio

[73] Assignee: Libbey-Owens-Ford Company, Toledo, Ohio

[21] Appl. No.: 785,202

[22] Filed: Apr. 6, 1977

[51] Int. Cl.² .............................................. C03B 23/02
[52] U.S. Cl. ...................................... 65/273; 65/285; 65/287; 65/DIG. 4
[58] Field of Search ................. 65/107, 106, 273, 285, 65/287, DIG. 4

[56] References Cited

U.S. PATENT DOCUMENTS

| | | | |
|---|---|---|---|
| 3,762,903 | 10/1973 | Hamilton | 65/107 |
| 3,762,904 | 10/1973 | Hamilton et al. | 65/107 |
| 3,879,184 | 4/1975 | Hamilton et al. | 65/107 |
| 4,015,969 | 4/1977 | Brown et al. | 65/107 X |

Primary Examiner—Arthur D. Kellogg
Attorney, Agent, or Firm—Collins, Oberlin & Darr

[57] ABSTRACT

An apparatus for forming relatively sharp angled bends in a flat sheet of glass including a sectionalized gravity mold structure having electrical conducting means terminating in improved contact assemblies engageable with electrically conducting frit lines or paths formed on a glass sheet. The contact assemblies are mounted on the mold structure for movement along with the glass sheet relative to the mold during bending and offer continuous positive clamping contact with the electro-frit circuitry at all times.

10 Claims, 9 Drawing Figures

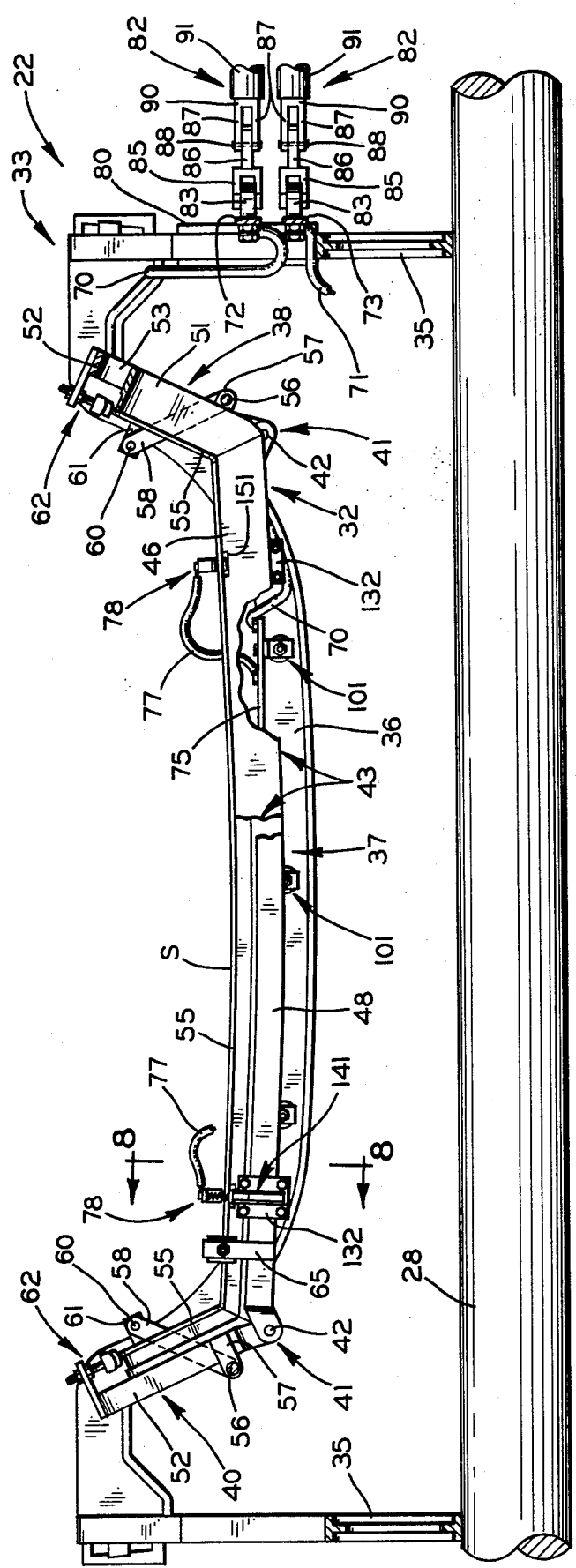
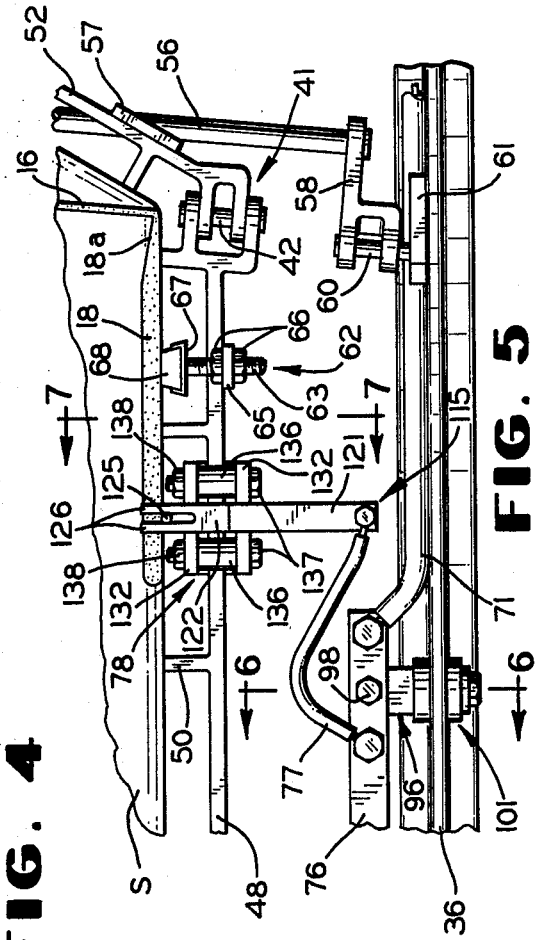
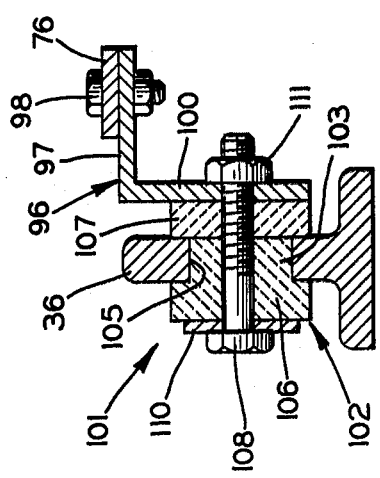
FIG. 4
FIG. 5
FIG. 6

ELECTRICAL CONTACT APPARATUS ON A GLASS SHEET GRAVITY MOLD

BACKGROUND OF THE INVENTION

The present invention relates generally to the production of bent sheets or plates of glass and, more particularly, to an improved electrical contact assembly employed in apparatus for forming relatively sharp angled bends in a glass sheet.

In some of the latest automotive designs, it has been found desirable to provide certain of the glazing closures, such as the backlights for example, with sharp bends to form a central panel portion extending continuously across the vehicle from one side to the other thereof, and integral end portions sharply bent inwardly relative to the central panel portion about generally vertical lines to extend longitudinally into the sides of the vehicle.

One successful technique developed for imparting such sharp bends to glass sheets is disclosed in U.S. Pat. Nos. 3,762,903 and 3,762,904, assigned to the same assignee as the present invention, whereby one or more electrically conducting paths are formed on at least one surface of the glass sheet along the line or lines about which it is desired to sharply bend the sheet. The sheet is then supported on a suitable gravity mold structure and heated in a furnace to a temperature corresponding to the softening point of the glass, causing it to sag by gravity into conformance with the shaping surfaces of the mold while simultaneously passing an electric current through the electrically conducting path or paths to heat the area of the glass sheet immediately adjacent said paths to a temperature above the aforementioned softening point, causing the sheet to bend along such path or paths to form the desired relatively sharp bends therein. Incorporating such a procedure in a fully automated, mass production operation poses problems in satisfactorily supplying and introducing the electric current to the electrically conducting paths on the glass sheets. A particularly critical problem in maintaining electrical continuity resides in the electrical contacts which make electrical connection with the paths or conducting lines on the glass sheet.

Attempts have been made to solve this problem by employing glass edge contactors mounted on the mold and which are spring biased against opposite edges of the sheet. While these perform satisfactorily, they require the electrically conducting paths to be extended to and along at least portions of the edges of the glass sheet. This is done by manually painting the silver-glass frit composition forming the paths along such edges after the automatic silk screen printing operation. Not only does this additional manual step add materially to production costs, but it also yields varying thicknesses of the composition applied, which tends to vary the electrical characteristics from sheet to sheet. Moreover, in the bending of glazing closures by the gravity mold technique, portions of the glass sheet move relative to the shaping surface of the mold as it sags from its flat condition to the final bent condition. This creates frictional movement between the contacts and the glass sheet edge, tending to scrape off the frit composition to produce conductor line burn outs. Also, this abrasive action causes the contacts to deteriorate, resulting in frequent contact replacement. Also, in the production of certain deep, sharply bent glazing closures, the relative movement between the glass sheet and the mold is great enough to cause the contacts to completely disengage or slide off the glass sheet edges.

Other attempts employing a top surface contact have not been entirely satisfactory because the severe rocking and turbulent advancement of the mold through a furnace induces vibrations in the top surface contacts, resulting in variations of contact pressure with attendant line burn out. Also, some of the silver-glass frit composition tends to fuse to and build up on the contacts formed of conventional materials, also causing burn outs.

SUMMARY OF THE INVENTION

Accordingly, it is a primary object of the present invention to provide a new and improved electrical contact assembly for use in a gravity type mold utilized for forming glass sheets with relatively sharp angled bends.

It is another object of this invention to provide means for mounting the foregoing contact assembly on a mold structure in a manner enabling the assembly to move along with the glass sheet through a wide range relative to its associated mold.

It is a further object of the present invention to provide a top surface electrical contact assembly which is simple and strong in construction, low in cost, rugged and durable in use, and which makes continuous positive contact with the electrical frit circuitry formed on the glass sheet at all times regardless of the amount of movement of the sheet and/or the adverse conditions encountered in a heating and bending furnace.

The foregoing and other objects, advantages, and characterizing features of the present invention will become clearly apparent from the ensuing detailed description of an illustrated embodiment thereof, taken together with the accompanying drawings wherein like reference characters denote like parts throughout the various views.

BRIEF DESCRIPTION OF THE DRAWINGS

FIG. 4 is a longitudinal sectional view, on an enlarged scale, taken along the line 4—4 of FIG. 3 with parts broken away for clarity, and showing the mold assembly in a closed position;

FIG. 5 is an enlarged fragmentary view of one corner of the mold assembly of FIG. 3, showing the electrical contact assembly of this invention in plan;

FIG. 6 is a vertical sectional view, on an enlarged scale, taken along line 6—6 of FIG. 5;

DESCRIPTION OF THE PREFERRED EMBODIMENT

Figure 1:
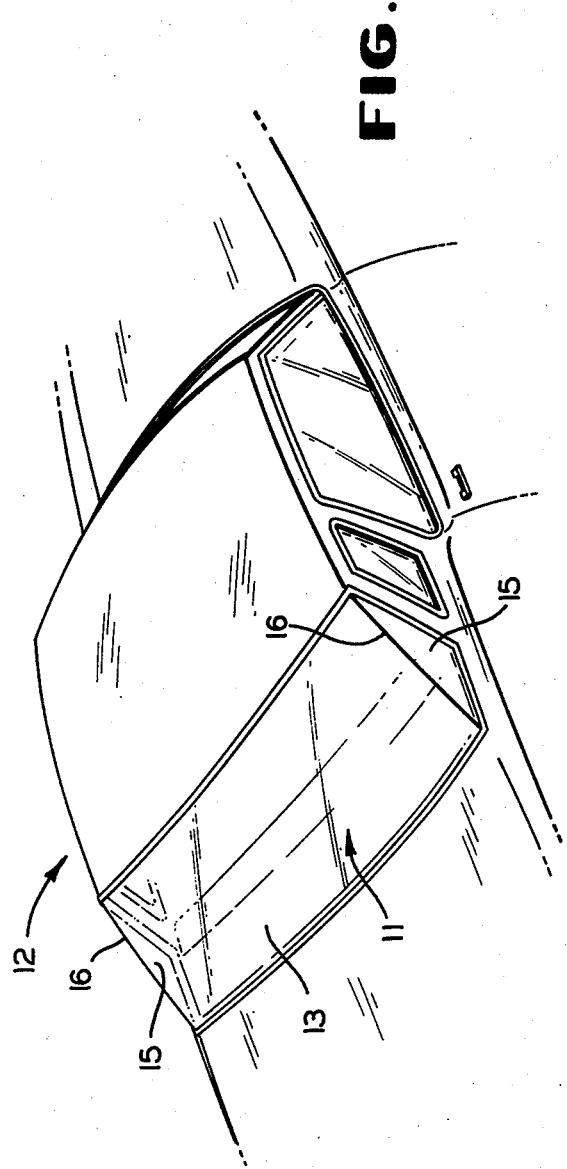
FIG. 1 is a perspective view of an automobile including a bent glass rear window or backlight produced in accordance with the present invention.
Figure 3:
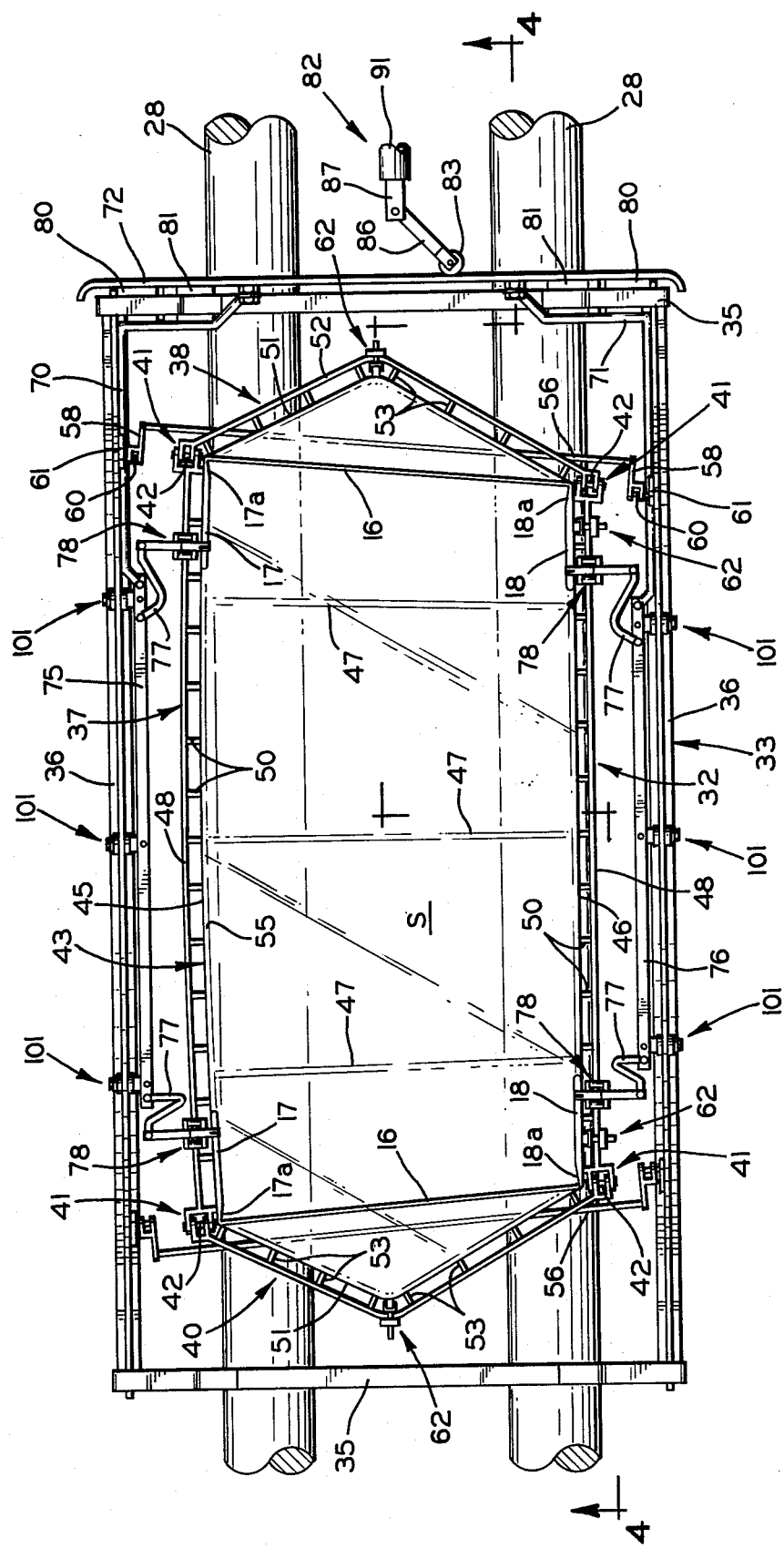
FIG. 3 is a top plan view of a gravity mold assembly shown in an open, glass receiving position, and which incorporates novel features of the present invention.

Referring now in detail to the drawings, there is depicted in FIG. 1 a backlight 11 bent to the desired configuration in accordance with this invention and shown installed in an automobile 12 embodying recent styling features. The backlight 11 is comprised of a monolithic glass sheet having a central body or panel portion 13 and inturned opposite end or side portions 15 of generally triangular configuration in outline. The side portions 13 are bent at sharp angles about straight line paths extending from one longitudinal edge of the sheet to the other adjacent the opposite sides of the automobile. The paths or axes of the bends are defined by electrically conducting paths or frit lines 16 formed on the inboard surface of the sheet prior to bending. As best shown in FIG. 3, each frit line or electrically conducting path 16 is formed with lateral path extensions 17 and 18 of any desired or required length at the opposite ends of the paths 16, and which extend along and parallel to the longitudinal edges of the sheet. The purpose and function of the electrically conducting paths 16 and path extensions 17 and 18 will be hereinafter described in detail. While it will be convenient to describe this invention in connection with a glazing closure comprised of a single sheet with two transversely extending sharp angular bends therein, it should be appreciated that this invention contemplates the production of glass sheets having any number of sharp angled bends in a transverse and/or longitudinal direction and/or multiple layered sheets of glass, such as conventional laminated windshields for example.

Figure 2:
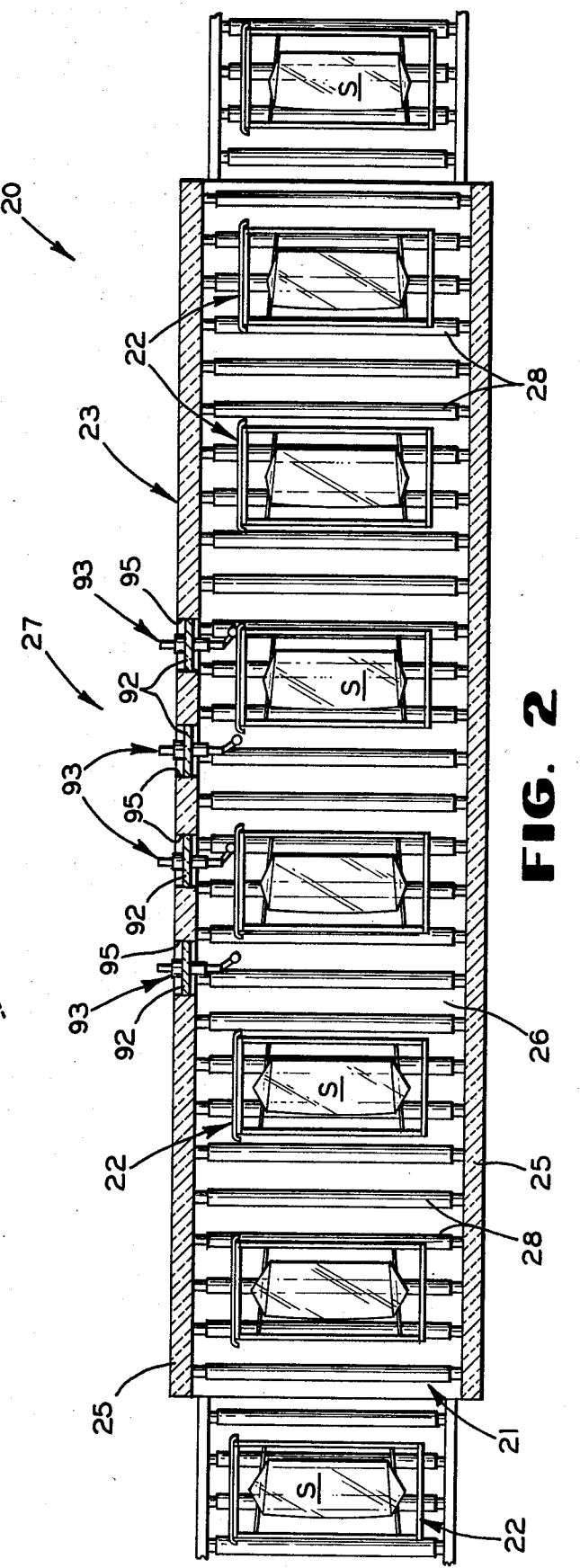
FIG. 2 is a top plan view of a bending furnace with the roof removed, showing a plurality of glass laden shaping mold assemblies being conveyed therethrough.

Referring now in detail to the illustrative embodiment of the apparatus depicted in the drawings for carrying out this invention, there is shown in FIG. 2 a glass sheet heating and bending installation, comprehensively designated 20, which includes a continuous, horizontal conveyor system 21 adapted to support and advance a series of glass laden mold assemblies, generally designated 22, in a continuous, substantially horizontal path through an elongated heating and bending furnace 23 for the purpose of heating the sheets S carried by the mold assemblies 22 to their softening point or bending temperatures. After bending, the mold assemblies 22 can be advanced by the conveyor system 21 into and through a tempering or annealing station (not shown).

The heating furnace 23 is of the tunnel-type having sidewalls 25, a top and bottom wall (not shown) defining a heating chamber 26. The heating chamber 26 can be heated in any desired manner by suitable heating means, such as gas burners or electrical resistance elements for example (not shown) located in the top and sidewalls of the furnace 23. Such heating means are suitably controlled by apparatus (also not shown) to obtain the desired temperature at various points in the heating chamber 26. In addition, furnace 23 is provided with electrical supply or conducting means, generally designated 27, adapted to deliver electrical current to each glass sheet S via its associated mold assembly 22 during the advancement thereof through furnace 23 for imparting one or more sharp, V-shaped bends to the sheet in a manner that will hereinafter be described in detail. The mold assemblies 22 are carried through the heating chamber 26 of furnace 23 on a plurality of conveyor rolls 28, forming a part of the conveyor system 21, and extending transversely across the furnace 23 with their respective opposite ends being suitably journalled for rotation and driven by conventional power means well known in the art.

Referring now to FIGS. 3 and 4, the mold assembly 22 employed to form the sharp angular bends in the finished glass product comprises an articulated, skeleton-type mold 32 mounted on a substantially rectangularly shaped support frame 33. This frame comprises a pair of upwardly extending end members 35 which are connected to each other at their upper ends by a pair of parallel, longitudinally extending mold supports 36 whose contour in elevation corresponds generally to the shape of the skeleton-type mold 32.

The mold 32 comprises a center section 37 and a pair of end sections 38 and 40 pivotally connected together at their adjacent ends by means of diametrically opposed hinge assemblies, generally designated 41, for pivotal movement between an open, glass receiving portion shown in FIG. 3 and a closed, final position shown in FIG. 4. These hinges 41 can be conventional and it is believed that no further amplification or description thereof is necessary, it being noted that each pair of horizontally opposed hinges includes horizontally aligned pivot pins 42 defining a common pivot axis about which the end sections 38 and 40 swing relative to the center section 37.

The mold center section 37 is provided with a shaping rail 43 comprised of laterally spaced elongated portions 45 and 46 connected together and maintained in a fixed, spaced relation by tie rods 47. The shaping rail 43 is carried by a mating support rail 48 comprised of opposed portions spaced slightly outwardly of shaping rail portions 45 and 46 and connected thereto by spacers 50.

The mold end sections 38 and 40 are substantially identical and mirror images of each other and each comprises a shaping rail 51 of substantially V-shaped configuration in plan. Each shaping rail 51 is carried by a mating support rail 52 having the same general outline as its associated shaping rail 51, but slightly larger in peripheral dimension than the latter and connected in spaced relation thereto by spacers 53. The top faces of shaping rails 43 and 51 are substantially continuous and together form an angular shaping surface 55 when closed conforming to the final shape of the glass sheet when bent as shown in FIG. 4. The shaping surface 55 in its entirety is spaced above the upper surfaces of the adjacent shaping rails 43 and 51. Of course, where only one sharp V-shaped bend is contemplated, the mold proper may be formed of only two sections hingedly connected together adjacent their inner ends rather than three pivotal sections as employed in the articulated mold shown and described in the illustrative embodiment of this invention.

To support the mold for movement from an open position wherein the flat glass sheet to be bent is received to the closed position of FIG. 4, a transversely extending pivot bar 56 is rigidly secured to each of the mold end sections 38, 40 by means of lugs 57 (FIG. 5) depending downwardly from the associated support rail 52 and through which the bar 56 extends. As best shown in FIG. 5, the opposite ends of each bar 56 are rotatably supported by links 58, in turn pivotally carried by pins 60 secured to lugs 61 rigidly secured to the mold supports 36 of frame 33. The pivot bars 56 are normally adjusted and located off center of their associated mold sections 38, 40 to allow the mold to close due to their weights unless a force is applied to the outermost ends of such mold sections, causing the same to pivot about bars 56 to raise the inner ends of the sections.

Locator stops, generally designated 62, are mounted at longitudinally spaced intervals along one transversely extending portion of support rail 48 and on support rails 52 at the apexes thereof for properly positioning the flat glass sheet S in the mold when in the open position. The opposed stops 62 on the mold end sections 38 and 40 exert pressure on the ends of the sheet while maintaining the same in proper relation to the mold during the bending thereof. As best shown in FIG. 5, each stop 62 comprises an elongated threaded rod 63 projecting through a support plate 65 affixed to the associated support rail and adjustably secured to such plate by means of lock nuts 66. A holder 67 is secured to the inner end of rod 63 for receiving a block 68 formed of any suitable heat-resistant material and which is engageable with the edge of the glass sheet.

As hereinbefore mentioned, one successful process for forming relatively sharp, angular bends in glass sheets involves the formation of electrically conductive paths on at least one surface of the glass sheet along the lines about which it is desired to sharply bend the sheet. Electric current is then passed through these paths to heat the same by resistance and thereby the glass sheet in the area immediately adjacent or beneath the paths, causing the preheated sheet to bend by gravity along the paths to form sharp angled, V-shaped bends. The mold assembly 22 herein disclosed is employed to carry out the above process in a mass production operation and incorporates electrical conducting means for delivering the necessary electric charge to the glass sheet to be bent.

In the illustrative embodiment of this invention, the electric current preferably is introduced into the glass sheet as close as possible to the opposite ends of the electrically conducting paths 16. The reason for this is that the least amount of movement or displacement of the glass sheet relative to the mold during the sharp bending phase of the glass occurs along such paths, thereby minimizing the friction between the contacts and the frit circuitry and the possible removal of or damage to the conductive frit material which constitutes the electrically conducting paths 16. However, due to the obstructions and hardware located on the mold adjacent the end portions of such paths 16, contact access thereto is limited so that paths 16 are extended along the longitudinal edges thereof as by means of extensions 17 and 18. It should be noted, however, that the width or cross sectional area of paths 16 are substantially less than that of the path extensions 17 and 18 to consequently provide a substantially greater resistance to current flow than the latter and thereby the generation of relatively greater heat to effect the bend along the desired line formed by paths 16. In order to prevent possible damage to the opposite ends of conducting paths 16 due to the drastic transition of the greater cross sectional area of path extensions 17 and 18 to the lesser cross sectional area of paths 16, the cross sectional areas of path extensions 17 and 18 are reduced, as shown at 17a and 18a in FIGS. 3 and 5 for example, prior to the joining thereof with conducting paths 16.

The primary electrically conducting paths 16, as well as the path extensions 17 and 18, can be formed on each glass sheet S in accordance with the methods set forth in U.S. Pat. No. 3,762,903. If desired, a groove may be formed in one or both surfaces of the glass sheet along the lines about which it is desired to bend the sheet to facilitate the bending operation, as set forth in detail in U.S. Pat. No. 3,762,904, whereby the electrically conducting paths 16 would then be formed in one of such opposed grooves. While various materials may be used to form these electrically conducting paths and path extensions, preferred compositions are comprised of conductive metal pastes. These materials, sometimes also referred to as "inks", are applied to the glass sheet by conventional silk screen processes, painting, or other conventional uniform coating processes and then are heated or fired to fuse the material to the sheet.

Typically, the pastes comprise conductive metal particles, e.g. silver, glass frit particles and organic binders and salt. Although the conductive silver pastes are ideally suited for forming the electrically conducting paths 16 and path extensions 17 and 18, other conductive metal pastes may be used, e.g., those containing gold, paladium, platinum and alloys thereof. In addition, air drying dispersions of conductive metals may be employed. One particular material of this type which has been used successfully is "Dag 422", a dispersion of silver plus graphite in a water carrier obtained from the Atcheson Colloids Company, Port Huron, Mich. Also, materials such as electrically conducting tapes, which may or may not be removed after the bending step, can be employed.

As earlier mentioned, the mold assembly 22 of the present invention is especially adapted to carry out the above bending process in a mass production operation and embodies the necessary electrical conducting means for delivering the electrical charge to the glass sheet to be bent. The electrical conducting means on mold assembly 22 for delivering current from the electrical supply means 27 of heating furnace 23 to portions of the glass sheet in order to effect the desired relatively sharp angular bends therein includes a pair of conductor leads 70 and 71 connecting a pair of outer bus bars 72 and 73 mounted on one of the end members 35 of support frame 33 to a pair of bus bars 75 and 76, respectively, suitably mounted within the support frame 33 in generally parallel, spaced relation to mold supports 36, as will hereinafter be described. A plurality of flexible conductor leads 77 electrically connect bus bars 75 and 76 to a plurality of contact assemblies, generally designated 78, constructed in accordance with this invention and which will hereinafter also be described in detail.

The outer bus bars 72 and 73 of support frame 33 are connected to one of the support frame end members 35 and extend transversely thereacross in spaced relation thereto by means of insulating blocks 80 and 81 held in place by suitable fasteners (not shown). These bus bars 72 and 73 are adapted to be engaged by a pair of electrically conducting probe assemblies, generally designated 82, connected to a suitable source of electrical power (not shown) and forming a part of the electrical supply means 27 of furnace 23. Each probe assembly 82 comprises a contact wheel 83 rotatably journalled in a yolk 85 affixed to the distal end of an arm 86 pivotally mounted between a pair of extensions 87 by means of a pivot pin 88. The extension 87 is formed integral with a tube 90 adjustably slidably received in a sleeve 91, in turn rigidly secured in a suitable opening formed in a plate 92 (FIG. 2) removably secured in the furnace sidewall 25. Means (not shown) are provided for biasing the probe arms 86 into an extended position into the path of movement of bus bars 72 and 73 so as to be engaged thereby at a critical time during conveyance of the mold assembly 22 through the furnace.

The probe assemblies 82 are mounted in pairs on plate 92, which as mentioned earlier, is removably secured in the furnace wall 25. Thus, each pair of probe assemblies 82 and its associated plate 92 form a removable unit 93, which can be selectively inserted into or removed from suitable openings 95 formed in one of the sidewalls 25 of furnace 23. As shown in FIG. 2, a number of such units 93 are mounted in a longitudinally spaced relation along furnace wall 25 in such a manner as to assure electrical contact of at least one pair of the probe assemblies 82 with the bus bars 72 and 73 of mold assembly 22 during its passage through the furnace 23 for a time sufficient to heat the glass sheet in the area of conducting paths 16 to a temperature above the bending point of the glass.

The means for mounting bus bars 75, 76 on support frame 33 includes a plurality of generally inverted L-shaped mounting brackets 96 (FIG. 6) having horizontal legs 97 to which are secured the associated bus bars, as by fasteners 98, and vertical legs 100 secured at their lower ends to mold supports 36 by connecting means, generally designated 101. While preferably three such supporting brackets 96 are utilized for each bus bar, it should be appreciated that more or less than three can be employed, as desired or required.

As shown in FIG. 6, each connecting means 101 includes a composite, two-piece insulator having a first section 102 consisting of a bushing 103 received in a complementary opening 105 formed in mold support 36 and an enlarged diameter flange 106 bearing against one face of the support 36. The other or second insulator section 107 is in the form of a disc abutting the other face of support 36. These sections 102 and 107 are suitably bored to receive a bolt 108, which also extends through the vertical leg 100 of bracket 96. A washer 110 can be utilized at the head end of bolt 108 and a suitable nut 111 is threaded onto the other end and tightened against bracket leg 100 to secure the assembly in place. Sections 102 and 107 are formed of a suitable non-conducting material to electrically insulate the bus bars and thereby contact assemblies 78 from the mold frame 33.

Figure 7:
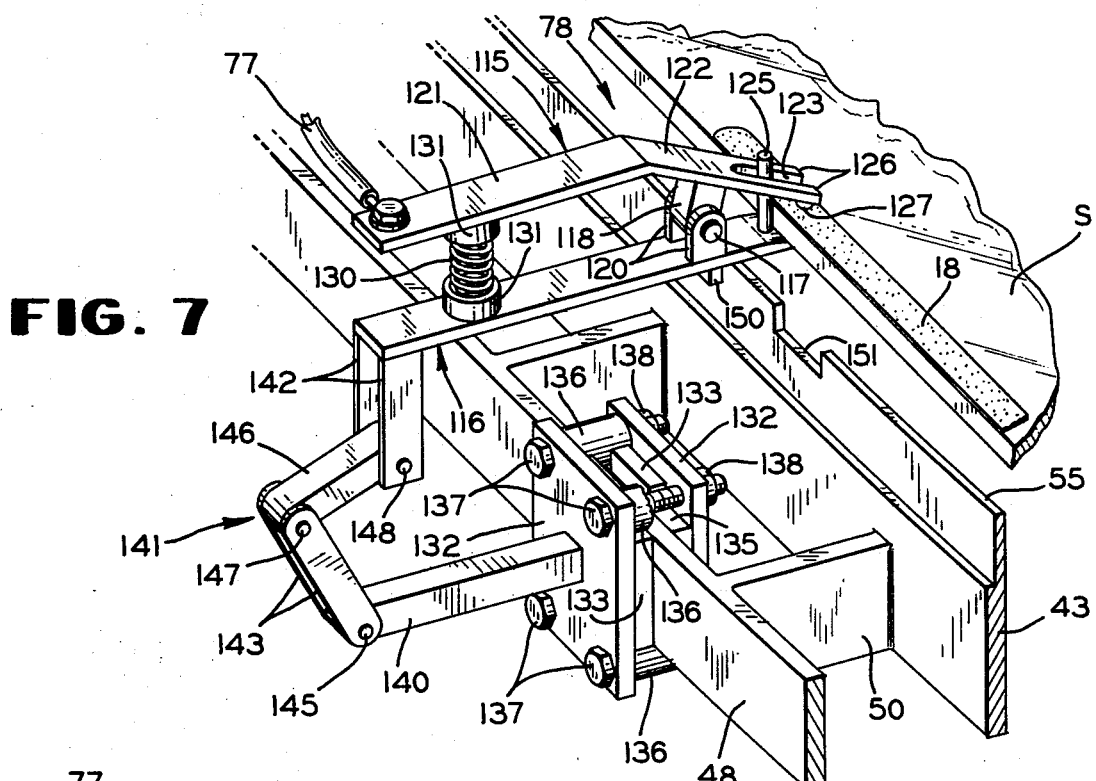
FIG. 7 is a perspective view partly in section, on an enlarged scale, taken along line 7—7 of FIG. 5, showing details of the electrical contact assembly of this invention.
Figure 8:
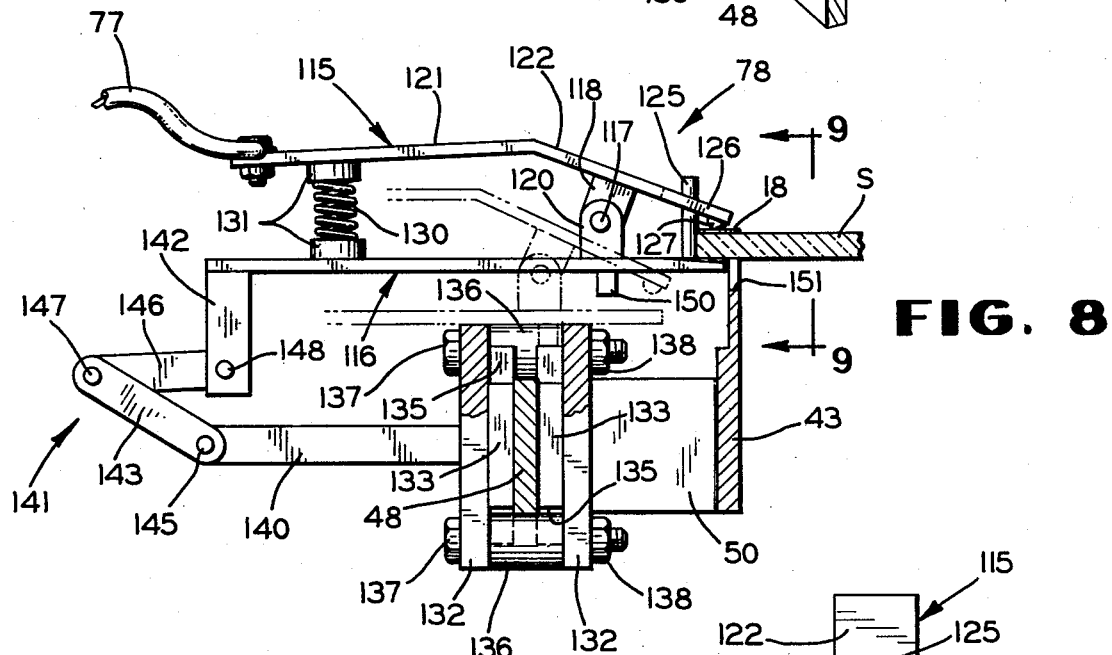
FIG. 8 is a vertical sectional view, on an enlarged scale, taken along line 8—8 of FIG. 4.
Figure 9:
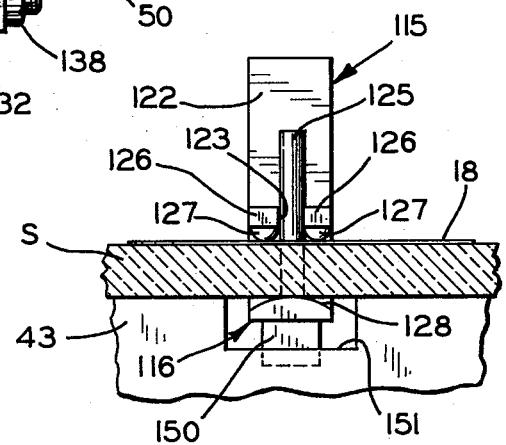
FIG. 9 is a vertical sectional view, on an enlarged scale, taken along line 9—9 of FIG. 8.

With reference now in detail to FIGS. 7, 8 and 9, each contact assembly 78 is in the form of a clip having an upper finger 115 and a lower finger 116 pivotally mounted together adjacent their forward ends by means of a pivot pin 117 extending through a downwardly projecting lug 118 secured to upper finger 115 and a pair of upstanding lugs 120 secured to lower finger 116. The upper finger 115 is provided with a straight major portion 121 and an angularly related bent portion 122 formed with a slot 123 extending inwardly from the distal end thereof. The slot 123 accommodates an upright pin 125 welded or otherwise fixedly secured at its lower end to the lower finger 116. Pin 125 serves as a stop limiting inward movement of the fingers relative to the glass sheet S.

The slot 123 also defines a pair of tines 126, each of which is provided with a contact member 127 of generally semi-spherical shape preferably formed of tungsten. The rounded surfaces of contact members 127, together with the spaced apart relation therebetween, assures positive contact with the electrically conducting path extensions 17 and 18, regardless of the severe vibrations and rocking movement often imparted thereto during mold advancement through a heating and bending furnace. The forward end of the lower finger 116 also is formed with an arcuately shaped bearing surface 128 (FIG. 9) to accommodate such movements. While contact members 127 preferably are formed of tungsten because of its durability, electrical conducting and anti-adhering properties when heated, it should be understood that they can be formed of any suitable material possessing similar properties.

The forward ends of fingers 115 and 116 are biased into a closed position by means of a heat-resistant, helical spring 130 mounted at its opposite ends in retainer cups 131 rigidly secured to the opposed faces of fingers 115 and 116. Spring 130 provides a strong force urging fingers 115 and 116 toward each other in clamping engagement against the opposite surfaces of the glass sheet with contact members 127 bearing against the electrically conducting path extensions thereon. In addition to urging fingers 115 and 116 together, the strength of the spring also serves to dampen vibrations transmitted to fingers 115, 116, further facilitating and maintaining them in continuous contact with the frit circuitry on the glass sheet.

The means for mounting each contact assembly 78 on mold 32 includes a pair of mounting plates 132 disposed on opposite sides of support rail 48 and a pair of insulating blocks 133 sandwiched between rail 48 and plates 132. Each of the insulating blocks 133 has a generally cruciform shape in outline defined by cut-out sections 135 (FIG. 7) at the four corners to accommodate bushings 136 which receive bolts 137 extending therethrough and through the plates 132 and blocks 133. The mounting assembly formed by plates 132, blocks 133 and the sleeves 136 forms a unit which can be slid longitudinally along support rail 48 to selectively position the same anywhere therealong. Suitable nuts 138 are threaded onto the bolts 137 against the inner mounting plate 132 for securing the assembly in a selected position along support rail 48.

The means for connecting the fingers 115 and 116 of the clip construction to the mounting assembly includes an elongated bar 140 projecting axially outwardly from outer plate 132 and a link means, generally designated 141, connecting bar 140 to a pair of legs 142 extending downwardly from the lower face of lower finger 116 adjacent the rear end thereof. The link means 141 includes a pair of laterally spaced links 143 pivotally mounted at their one ends to the outer end of bar 140 about a horizontal axis defined by pivot pin 145 and pivotally mounted at their other ends to a link 146 about a second horizontal axis defined by pivot pin 147. Link 146, in turn, is pivotally mounted between legs 142 adjacent their lower ends about a third horizontal axis defined by a pivot pin 148. This link arrangement enables the fingers 115, 116 to be vertically and pivotally moved through a wide range relative to the associated mold 32, providing sufficient flexibility for movement along with the glass sheet relative to the mold during the bending operation.

The combined vertical and pivotal movement of the contact assembly 78, via the link arrangement 141, when in clamping engagement with the glass sheet during descending movement thereof is important in assuring optimum clamping engagement therewith at all times. If, for example, the contact assembly were mounted on the mold for pivotal movement only, any appreciable vertical glass movement downwardly toward the mold shaping surface would cause the contact assembly to move through a large arc, orienting the same at progressively steeper angular attitudes relative to the glass sheet to increase the possibilities of the contact members 127 slipping or sliding off the glass-frit circuitry of the sheet. However, the link arrangement connecting each contact assembly 78 to the mold of the present invention offers both vertical and pivotal movement to maintain the contact asssembly 78 at an optimum position relative to the glass sheet, e.g. substantially horizontal therewith, and thereby provide the most favorable clamping conditions at all times regardless of the extent of glass movement relative to its mold to minimize, if not entirely eliminate, accidental or inadvertent slippage or removal of the contact assembly from the glass sheet.

In order to retain the fingers and thereby contact members 127 at rest in an out-of-the way position to preclude possible mold contact and shortening out thereof, the lower finger 116 is provided with an abutment member 150 in the form of a stop projecting downwardly from the lower face of finger 116 and which is adapted to be received in the space between mounting plates 132, as shown in dotted outline in FIG. 8. Also, a groove 151 is formed in shaping rail 43 downwardly from the shaping surface 55 thereof to provide clearance for the lower finger 116 in the event the edge of the glass sheet S doesn't project sufficiently far outwardly beyond the shaping rail 43.

In a mass production operation, the flat glass sheets S with electrically conducting paths 16 and extensions 17 and 18, respectively, formed thereon are placed on mold assemblies 22 with each sheet being supported adjacent its opposite ends on the shaping surface 55 of end section shaping rails 51 at their apexes when the mold assembly 22 is in its open position (FIG. 3). These sheet opposite ends also engage the opposed locator stops 62 and the flat glass sheet S functions as a strut to retain the mold in the open position during the early stages of the bending operation. The contact assemblies 78, which have been in their glass disengaging positions of rest indicated in phantom in FIG. 8 when the sheet S is placed on the mold, are then swung upwardly and inwardly into clamping engagement against the opposite surfaces of the glass sheet with contact members 127 bearing against the electrically conducting path extensions 17 and 18 formed on the sheet. The mold assemblies 22 are then loaded at spaced intervals on the conveyor 21 at the entrance end of the furnace 23 and are advanced therethrough on conveyor rolls 28. Prior to introducing power to the mold assemblies 22, the glass sheets S are heated to a relatively high temperature in furnace 23, for example, above the strain point of the glass but below the temperature at which the glass bends to any significant degree. To this end, temperatures in the range of approximately 900° F to 1100° F have been found satisfactory. This preliminary heating is to prevent inducing permanent stresses in the glass, obviate the tendency of the glass to crack when subsequently heated locally along the electrically conducting paths 16 to its bending temperature, and also to enable the accomplishment of this latter step within the time acceptable from a commercial standpoint and with the use of a reasonable amount of electrical energy.

At about the time the advancing glass sheet reaches the desired overall temperature, the exterior bus bars 72 and 73 of the sheet supporting mold assembly 22 engage the contact wheels 83 of the first pair of extended probe assemblies 82 to complete a circuit and supply electrical power to the electrically conducting paths 16 via one of the probe assemblies 82, bus bar 72, connector lead 70, bus bar 75, flexible leads 77, fingers 115, contact members 127, connecting path extensions 17, connecting paths 16, connecting path extensions 18, contact members 127 and fingers 115 of the opposed contact assembly 78, flexible leads 77, bus bar 76, connector lead 71, bus bar 73 and the other probe assembly 82. As the mold assembly 22 advances along the conveyor, each succeeding pair of probe assemblies 82 engages bus bars 72 and 73 after the preceding pair of probe assemblies 82 have been disengaged therefrom to pass substantially the same current, although interrupted, into the mold-glass circuit. While four units 93 or pairs of probe assemblies 82 are employed in the illustrative embodiment of FIG. 2 for ease of illustration, it should be appreciated that this number may vary as dictated by the speed of conveyor rolls 28 and the time necessary to adequately heat the sheet in the area immediately adjacent or beneath paths 16 to a temperature above the bending point of the glass. When the areas of the sheet underlying paths 16 are heated to a temperature above the bending temperature of the glass, for example above approximately 1200° F, the sheet bends sharply along paths 16 and ultimately settles by gravity into the desired sharp angled, generally U-shaped configuration illustrated in FIG. 4.

It should be appreciated that the lesser cross-sectional areas of the electrically conductive paths 16 create a substantially higher resistance than path extensions 17, 18 so that the former will generate the necessary heat to effect the sharp bends in the glass sheet before path extensions 17, 18 are heated sufficiently to create any undesirable deformation therealong.

As the glass sheet becomes plastic during the heating thereof and beings to sag by gravity, the mold end sections 38 and 40 will begin to collapse toward the closed position, pivoting about the hinge assemblies 41. During the closing action, the contact members 127 are maintained in engagement against the conducting path extensions along the longitudinal marginal edges of the glass sheet by means of the clamping pressure exerted through their respective spring biased fingers 15 and 116, assuring the continued supply of electrical power to the conducting paths 16 about which the relatively sharp bends occur. Also, the link arrangement 143 - 148 connecting the clip contact assembly to its mounting on the mold about three horizontal axes provides sufficient flexibility, enabling the contact assembly to swing and move vertically along with the glass sheet relative to the mold during the bending cycle. The sheet continues to bend sharply along the paths 16 with consequent movement of mold sections 38 and 40 until the latter come to rest in the fully closed position. The sheet settles by gravity into registry with the continuous shaping surface 55 provided by shaping rails 43 and 51 in the fully closed position of the mold (FIG. 4) to produce the desired sharp angled, generally U-shaped configuration of the finished product.

After bending, the glass laden mold assemblies 22 leave the furnace 23 and are advanced on conveyor 21 through a tempering station, whereat the opposite surfaces of the heated bent sheet S are subjected to blasts of a cooling medium, such as air for example. Upon leaving this latter station, the sheet may be further cooled to bring the temperature thereof down to a level sufficient for handling. The sheet is then advanced to a glass discharge station for automatic or manual unloading and whereat the contact assemblies 78 are disengaged from the bent sheet.

From the foregoing, it is apparent that the objects of the present invention have been fully accomplished. A new and improved contact assembly is provided for maintaining continuous engagement with the electrical frit circuitry formed on the glass sheet. By the provision of mean mounting each contact assembly on the mold through a linkage arrangement for pivotal movement about three horizontal axes, the contact assembly has a wide range of movement along with the glass sheet relative to its associated mold. Providing the contact assembly with a strong clamping bias, together with a spaced apart two-point contact with the glass circuitry assures electrical contact therewith regardless of vibrations and rocking movement imparted thereto during conveyance of the mold through a heating and bending furnace.

It is to be understood that the form of the invention herewith shown and described is to be taken as an illustrative embodiment only of the same, and that various changes in the shape, size and arrangement of parts may be resorted to without departing from the spirit of the invention.

I claim:

1. In apparatus for forming relatively sharp angled bends in glass sheets including a frame, an outline type bending mold supported on said frame and having a shaping surface formed thereon, electrically conducting means on said frame including electrical contact assemblies engageable with electrically conducting lines formed on a glass sheet supported on said mold; the improvement in which each of said contact assemblies comprises a pair of spaced fingers biased toward each other for clamping engagement against opposite surfaces of said glass sheet, at least one electrical contact member secured to one of said fingers and engageable with one of said electrically conducting lines, means mounting said contact assembly on said mold, said mounting means comprising a support affixed to said mold and link means connecting said contact assembly to said support for movement relative thereto about a plurality of horizontal axes enabling said contact assembly to pivot and move vertically through a substantial path of travel along with said sheet relative to said mold.

2. Apparatus according to claim 1, wherein said one finger is formed with a pair of spaced apart tines at the distal end thereof, each tine having an electrical contact member secured thereto.

3. Apparatus according to claim 2, wherein each contact member is semi-spherical in shape and defines an arcuately shaped contact surface.

4. Apparatus according to claim 2, wherein each contact member is formed of tungsten.

5. Apparatus according to claim 2, including a stop member projecting from the other of said fingers and extending between said tines of said one finger to limit advancement of said finger inwardly relative to said glass sheet.

6. Apparatus according to claim 1, including means for electrically insulating said contact member from said mold.

7. Apparatus according to claim 1, wherein said support is adjustably mounted on said mold for selective positioning therealong.

8. Apparatus according to claim 7, including means forming a part of said support for electrically insulating said support and associated contact member from said mold.

9. Apparatus according to claim 1, wherein said link means comprises a series of links interposed between said support and said contact member for pivotal movement about three horizontal pivot axes.

10. Apparatus according to claim 1, including an abutment member on the other of said fingers adapted to be inserted in a cavity formed in said support for supporting said contact assembly away from said mold shaping surface when disengaged from said glass sheet.

* * * * *